United States Patent
Miwa et al.

(10) Patent No.: US 8,536,480 B2
(45) Date of Patent: Sep. 17, 2013

(54) ENCODER DAMPENING MECHANISM

(75) Inventors: Hiroshi Miwa, Tochigi (JP); Koichi Matsumoto, Tochigi (JP); Teruaki Kobayashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 12/972,766

(22) Filed: Dec. 20, 2010

(65) Prior Publication Data

US 2011/0155699 A1    Jun. 30, 2011

(30) Foreign Application Priority Data

Dec. 28, 2009  (JP) .................... 2009-296989

(51) Int. Cl.
*B23K 9/32* (2006.01)
(52) U.S. Cl.
USPC ............. 219/86.25; 219/78.01; 219/86.1
(58) Field of Classification Search
USPC ............. 219/86.25, 78.01, 86.1; 192/30 V
See application file for complete search history.

(56) References Cited

U.S. PATENT DOCUMENTS

| | | | |
|---|---|---|---|
| 6,907,969 B2 * | 6/2005 | Ichikawa et al. | 188/379 |
| 7,067,768 B2 * | 6/2006 | Miwa et al. | 219/137.62 |
| 2004/0017033 A1 | 1/2004 | Ichikawa et al. | |
| 2004/0208031 A1 | 10/2004 | Miwa et al. | |

FOREIGN PATENT DOCUMENTS

| | | |
|---|---|---|
| JP | S61-034406 U | 3/1986 |
| JP | 9250781 | 9/1997 |
| JP | 11-197843 | 7/1999 |
| JP | 2001-205447 | 7/2001 |
| JP | 2001205447 | 7/2001 |
| JP | 2003148556 | 5/2003 |

OTHER PUBLICATIONS

Notice of Reasons for Rejection issued to JP Application No. 2009-296989, mailed Nov. 13, 2012, 1 page.

* cited by examiner

*Primary Examiner* — Henry Yuen
*Assistant Examiner* — John Wasaff
(74) *Attorney, Agent, or Firm* — Rankin, Hill & Clark LLP (57) ABSTRACT

In an encoder dampening mechanism for an electric spot welding gun equipped with a motor that is accommodated inside of a motor housing and causes a hollow rotor to rotate, and an encoder main body that detects a rotation angle of the hollow rotor, the encoder dampening mechanism includes: a thin plate that is formed with a top surface that is larger in a surface area than a base surface of the encoder main body, and on which the base surface of the encoder main body is installed within the top surface; and a thin plate mounting portion that connects the thin plate to the motor housing via the thin plate support part and the thin plate pressure part, which dampen vibration.

2 Claims, 5 Drawing Sheets

ENCODER DAMPENING MECHANISM

CROSS-REFERENCE TO RELATED APPLICATIONS

This application is based on and claims the benefit of priority from Japanese Patent Application No. 2009-296989, filed on 28 Dec. 2009, the content of which is incorporated herein by reference.

BACKGROUND OF THE INVENTION

1. Field of the Invention

The present invention relates to an encoder dampening mechanism. More specifically, the present invention relates to an encoder dampening mechanism for an electric spot welding gun equipped with a servo motor that is accommodated inside of a motor housing and causes a rotor to rotate, and an encoder that detects a rotation angle of the rotor.

2. Related Art

Conventionally, an electric spot welding gun has been used when overlapping and welding plate materials. Such an electric spot welding gun is equipped with a pair of electrode tips disposed to sandwich welding target members. From among the pair of electrode tips, one electrode tip is fixed, and the other electrode tip is made to abut the welding target members, so as to perform spot welding.

In addition, such an electric spot welding gun includes a motor housing that forms a main body, a servo motor that is accommodated in this motor housing, and an encoder that detects the rotation angle of a rotor applying torque on a feed screw mechanism of this servo motor. The welding gun plots the position of the other electrode tip based on the rotation angle of the rotor detected by the encoder and the pitch of a feed screw mechanism, and causes the other electrode tip to abut the welding target member.

Incidentally, shock in the axial direction of the rotor may act on this rotor of the servo motor via the feed screw mechanism when such an electric spot welding gun is plotting the position of the other electrode tip and causing it to abut the welding target member.

In this case, if the encoder is directly connected in the axial direction of the rotor, the shock acting in the axial direction via the rotor will inflict damage on the internal components of the encoder. This encoder has thus been the cause of malfunctions.

In light of this, an encoder dampening mechanism for an electric spot welding gun has been illustrated in Japanese Unexamined Patent Application Publication No. H11-197843 in which an input shaft of the encoder is coupled, via a cushion member that absorbs axial shock acting thereon via a rotor of a servo motor, to this rotor. According to this dampening mechanism, shock in the axial direction acting via the rotor can be absorbed by the cushion member.

SUMMARY OF THE INVENTION

Incidentally, electric spot welding guns are attached to a robot arm to perform welding operations.

When this robot arm moves, shock may also act on the electric spot welding gun in a direction orthogonal to the axial direction of the rotor. However, since shock in a direction orthogonal to the axial direction of the rotor cannot be absorbed with the encoder dampening mechanism of Japanese Unexamined Patent Application Publication No. H11-197843, the internal components of the encoder may be damaged by this shock. In particular, in a case of the peripheral shape of the encoder being a flat shape expanding in a direction orthogonal to the axial direction of the rotor, the encoder is easily affected by shock in the direction orthogonal to the axial direction of the rotor.

The present invention has an object of providing an encoder dampening mechanism that absorbs shock acting on an encoder having a peripheral shape that is a flat shape, and prevents failure of the encoder.

An encoder dampening mechanism according to the present invention is an encoder dampening mechanism for an electric spot welding gun (e.g., the electric spot welding gun 1 described later) equipped with gun equipped with a servo motor (e.g., the motor 30 described later) that is accommodated inside of a motor housing (e.g., the motor housing 20 described later) and causes a rotor (e.g., the hollow rotor 31 described later) to rotate, and an encoder (e.g., the encoder main body 51 described later) that detects a rotation angle of the rotor. The mechanism includes: a thin plate (e.g., the thin plate 53 described later) that is formed with a top surface (e.g., the top surface 532 described later) that is larger in a surface area than a base surface of the encoder, and on which the base surface of the encoder is installed within the top surface of the thin plate; a thin plate mounting portion (e.g., the thin plate mounting portion 55 described later) that connects the thin plate to the motor housing via a cushioning material (e.g., the thin plate mounting portion 553 and the thin plate pressure part 554 described later) that dampens vibration.

According to this invention, the encoder dampening mechanism includes a thin plate that forms a surface area of a top surface thereof that is larger than the surface area of the base of the encoder and on which the base of the encoder is installed within the top surface, and a thin plate mounting portion that connects the thin plate to the motor housing via the cushion material, which dampens vibration.

With this, the encoder can be stably installed even if the encoder has a peripheral shape that is a flat shape, by installing the encoder on the thin plate having a top surface that is formed to be larger than the surface area of the base surface of this encoder. In addition, since shock transmitted from the motor housing can be absorbed by the cushion material, by connecting, via cushion material that dampens vibration, the thin plate on which this encoder is installed, it is possible to prevent this shock from acting on the encoder installed on the thin plate. Therefore, an encoder dampening mechanism can be provided that absorbs shock acting on an encoder having a peripheral shape that is a flat shape, and prevents failure of the encoder.

According to the present invention, it is possible to provide an encoder dampening mechanism that absorbs shock acting on an encoder having a peripheral shape that is a flat shape, and prevents failure of the encoder.

DETAILED DESCRIPTION OF THE INVENTION

Figure 1:
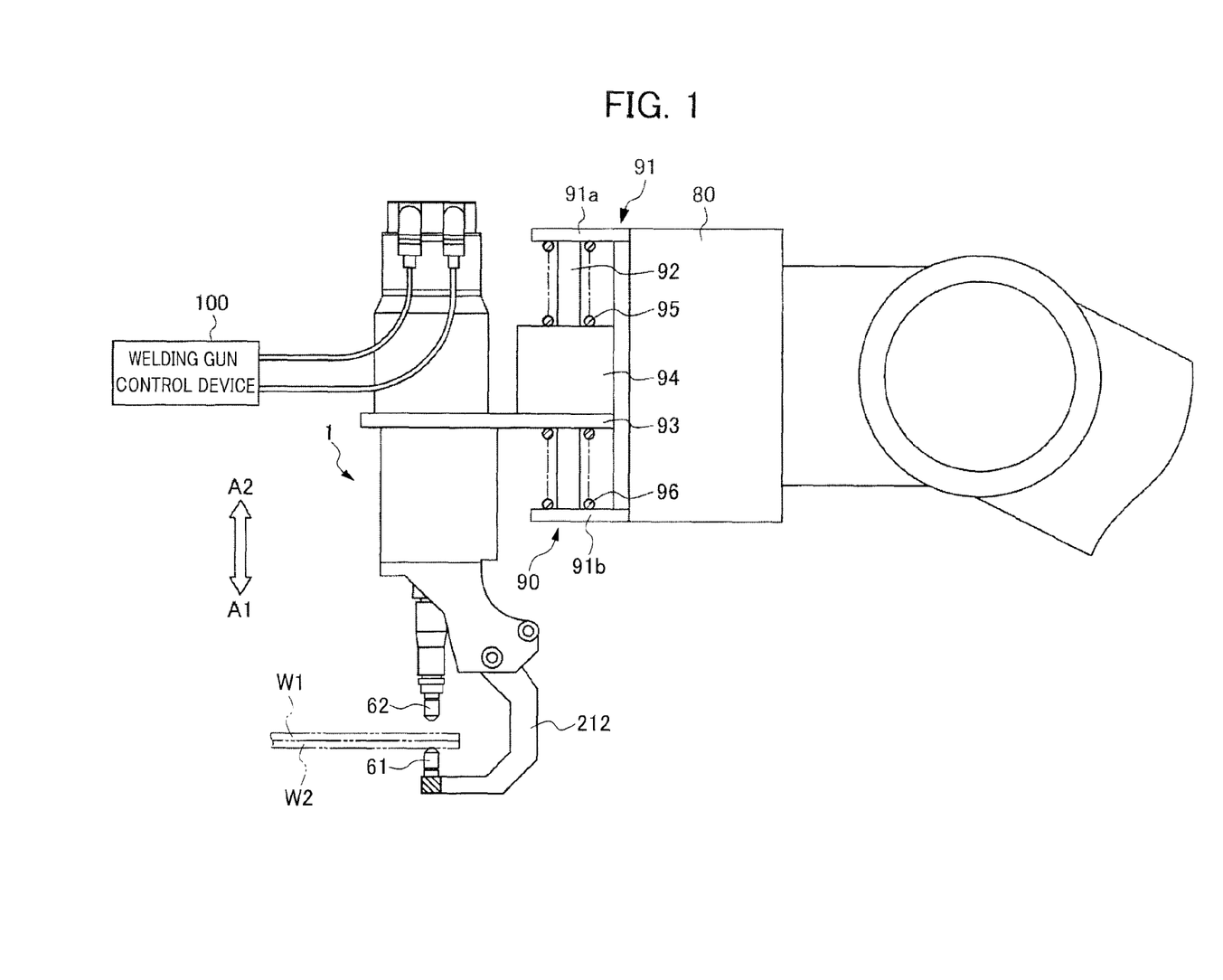
FIG. 1 is a partial simplified side view showing an electric spot welding gun according to an embodiment of the present invention attached to a leading end of a robot arm.

Hereinafter, an embodiment of the present invention will be explained with reference to the drawings. FIG. 1 is a partial simplified side view showing an electric spot welding gun 1 according to the embodiment of the present invention in a state attached to a leading end of a robot arm 80. The electric spot welding gun 1 is attached to a gun support portion 90 provided to a leading end of the robot arm 80. In addition, a welding gun control device 100 is electrically connected to the electric spot welding gun 1. Moreover, the electric spot welding gun 1 is configured as a C-type welding gun that reciprocally moves a moveable electrode tip 62 in an arrow A1 direction or an arrow A2 direction relative to a fixed electrode tip 61, which is fixed at a leading end side (arrow A1 side shown in FIG. 1) by a fixed electrode tip mounting portion 212, to open and close between the fixed electrode tip 61 and the moveable electrode tip 62, as described later.

The gun support portion 90 includes a gun support bracket 91, and this gun support bracket 91 includes a top plate 91a and a bottom plate 91b that extends in parallel with this top plate 91a. A guide bar 92 is bridged between the top plate 91a and the bottom plate 91b.

A plate 93, which is slidable in the axial direction of the guide bar 92 and is parallel to the top plate 91a and the bottom plate 91b, fits to the guide bar 92. A support 94 of a cabinet shape is arranged on top of the plate 93 on a side near the robot arm 80, and a first coil spring 95 wound around the guide bar 92 is interposed between the top plate 91a and the support 94. Similarly, a second coil spring 96 wound around the guide bar 92 is interposed between the bottom plate 91b and the plate 93.

In addition, the plate 93 fastens and retains the electric spot welding gun 1 on a side separated from the robot arm 80. The electric spot welding gun 1 is disposed so as to position works W1 and W2, which are welding target members, between the fixed electrode tip 61 and the moveable electrode tip 62 according to the movement of the robot arm 80 and the gun support portion 90. Then, according to the control of the welding gun control device 100, the electric spot welding gun 1 causes the moveable electrode tip 62 to move relative to the fixed electrode tip 61 to the arrow A1 side, and then welds the works W1 and W2 together.

Figure 2:
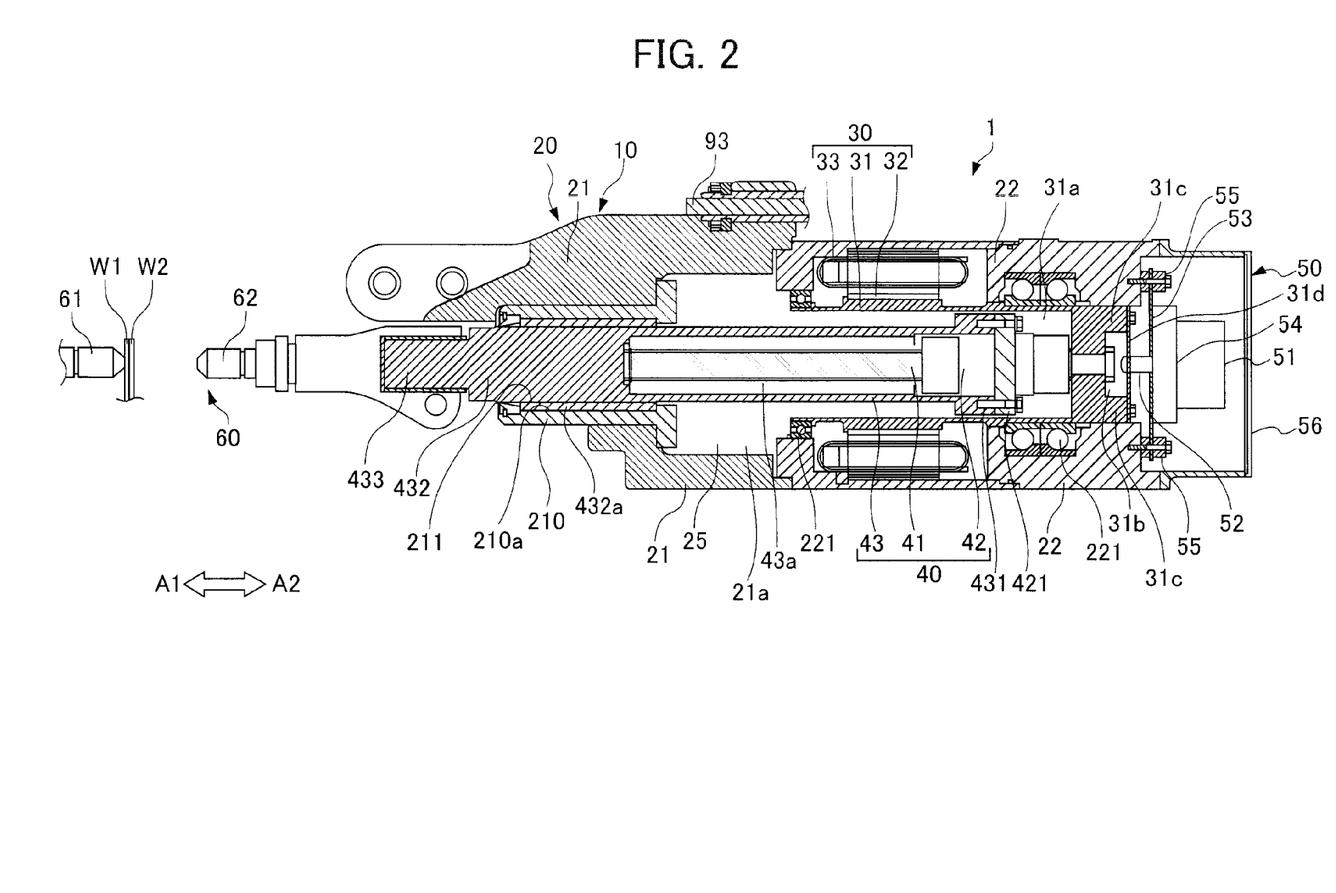
FIG. 2 is a view showing an outline configuration of the electric spot welding gun according to the embodiment.

Next, the configuration of the electric spot welding gun 1 will be explained. FIG. 2 is a view showing an outline configuration of the electric spot welding gun 1 according to the embodiment of the present invention.

The electric spot welding gun 1 includes a servo motor 10 having a hollow structure, a feed screw mechanism 40 coupled to the servo motor 10 at a base end side thereof (arrow A2 side shown in FIG. 2), an encoder portion 50 connected to the servo motor 10, and an electrode tip 60 provided to a leading end side (arrow A1 side shown in FIG. 2) of the feed screw mechanism 40. The servo motor 10 has a hollow rotor 31 that rotationally drives. The feed screw mechanism 40 is disposed inside of the hollow rotor 31, and has a hollow rod 43 that reciprocally moves in a predetermined direction by way of the torque applied from the hollow rotor 31. The encoder portion 50 is connected to the hollow rotor 31 by an input shaft 52 that projects from the encoder main body 51, and detects the rotation angle of the hollow rotor 31. The electrode tips 60 are a pair of electrode tips that sandwich and weld the works W1 and W2, and include a fixed electrode tip 61 and a moveable electrode tip 62, which is connected to a leading end portion of the hollow rod 43. Hereinafter, the details of each configuration of the electric spot welding gun 1 will be explained.

The servo motor 10 includes a motor housing 20 that forms a main body of the electric spot welding gun 1 and accommodates a portion of the feed screw mechanism 40, and a motor 30 that is accommodated in the motor housing 20 and rotationally drives the hollow rotor 31 by way of electric power supplied from the welding gun control device 100 (refer to FIG. 1).

The motor housing 20 includes a casing 21 that supports a leading end side (arrow A1 side shown in FIG. 2) of the feed screw mechanism 40, and a motor cover 22 that is coupled to a base end side (arrow A2 side shown in FIG. 2) of the casing 21 and accommodates the motor 30.

The casing 21 has a rod support portion 210 that supports a leading end side (arrow A1 side shown in FIG. 2) of the hollow rod 43 of the feed screw mechanism 40 to be reciprocally moveable. A portion of the hollow rod 43 travels in and out of the motor housing 20 by sliding and passing through this rod support portion 210. A rod-support portion hollow part 211 through which the hollow rod 43 passes is formed in the rod support portion 210. A plurality of spline grooves 210a extending in the direction in which the hollow rod 43 reciprocally moves is formed in the rod support portion 210 in an inside wall forming the rod-support portion hollow part 211. These spline grooves 210a engage to be reciprocally moveable with splines 432a described later, which are formed in the hollow rod 43. With this, the hollow rod 43 reciprocally moves without being allowed to rotate.

In addition, a casing hollow part 21a that accommodates a portion of the hollow rod 43 to be reciprocally movable in the axial direction is formed in the casing 21. Moreover, the casing 21 is fastened and retained to the plate 93 of the gun support portion 90 (refer to FIG. 1) that is provided to a leading end of the robot arm 80 (refer to FIG. 1).

The motor cover 22 is connected to a base end portion (arrow A2 direction shown in FIG. 2) of the casing 21, and rotatably retains the hollow rotor 31 of the motor 30 via a bearing 221.

The motor 30 includes a hollow rotor 31 formed in a tube shape, a magnet 32 of a ring-shape that is adhered to the outer circumference of the hollow rotor 31, and a coil 33 of a ring-shape disposed at a position facing this magnet 32. In other words, in the motor 30, the magnet 32 is disposed on the outer circumference of the hollow rotor 31 centered around this hollow rotor 31, and the coil 33 is disposed so as to face the outside circumference of this magnet 32 is accommodated in the motor cover 22.

The hollow rotor 31 is formed as a tube in which a leading end (arrow A1 side shown in FIG. 2) is opened and a base end (arrow A2 side shown in FIG. 2) is blocked. In other words, the hollow rotor 31 has a rotor hollow part 31a formed therein, and accommodates inside thereof a portion of the hollow rod 43 of the feed screw mechanism 40 to be reciprocally moveable in the axial direction. The rotor hollow part 31a is made to be a continuous space linked with the casing hollow part 21a of the casing 21, together forming a motor housing hollow part 25. In other words, a portion of the hollow rod 43 reciprocally moves in this motor housing hollow part 25 in the axial direction.

In addition, a base end of the hollow rotor 31 is coupled with the feed screw mechanism 40. In this base end of the hollow rotor 31, a concave part 31b is formed in substantially the center thereof, and a cushion member mounting part 31c vertically arranged in a ring shape around the concave part 31b is formed. In addition, a cushion member 31d, which covers the concave part 31b and is fixed to a cushion member mounting part 31c, is provided at the base end of the hollow rotor 31. This cushion member 31d is formed to be elastically deformable in the axial direction of the hollow rod 43 of the feed screw mechanism 40, and has a leading end of an input shaft 52 of the encoder portion 50 connected to substantially the center thereof. The cushion member 31d has a cushioning property in the axial direction of the hollow rotor 31, and can ensure the rigidity of the hollow rotor 31 in the rotational direction, by being attached to the cushion member mounting part 31c, which is vertically arranged in a ring shape.

The coil 33 generates a magnetic field from electric current being passed therethrough by way of the electric power supplied from the welding gun control device 100 (refer to FIG. 1). The hollow rotor 31 rotates in a direction and at a speed corresponding to the polarity and current, respectively, of the electric power supplied, by way of the interaction between the magnetic field generated by this coil 33 and the magnetic field of the magnet 32 adhered to the hollow rotor 31.

The feed screw mechanism 40 includes a ball screw 41 coaxially coupled to the hollow rotor 31, at the cushion member mounting part 31c of the hollow rotor 31 of the motor 30, a nut portion 42 that threads together with this ball screw 41, and the hollow rod 43 that is fixed to this nut portion 42. With this, the ball screw 41 rotates in conjunction with rotation of the hollow rotor 31. The nut portion 42 reciprocally moves in the axial direction of this ball screw 41 in conjunction with rotation of the ball screw 41. The hollow rod 43 reciprocally moves in the axial direction of the hollow rotor 31 in conjunction with reciprocal movement of the nut portion 42.

The nut portion 42 is formed with a slightly smaller diameter relative to the diameter of the rotor hollow part 31a, and has a hollow rod mounting portion 421 to which the hollow rod 43 is fixed.

The hollow rod 43 includes a base end portion 431 formed with substantially the same diameter as the hollow rod mounting portion 421 of the nut portion 42 and coupled to this hollow rod mounting portion 421, a shaft 432 that extends from this base end portion 431, slides and passes through the rod support portion 210 of the casing 21, to project to outside, and a moveable electrode tip mounting portion 433 that is provided to a leading end (arrow A1 side end portion shown in FIG. 2) of this shaft 432 and to which the moveable electrode tip 62 among the electrode tips 60 is attached.

The shaft 432 has a rod hollow part 43a formed therein, and accommodates the ball screw 41 inside thereof. In addition, splines 432a, which engage with a plurality of spline grooves 210a formed in an inner wall forming the rod-support portion hollow part 211, are formed in the shaft 432 in a portion sliding against the rod support portion 210. As described previously, the splines 432a engage together with the spline grooves 210a; therefore, the hollow rod 43 reciprocally moves in the axial direction thereof without being allowed to rotate in conjunction with rotation of the hollow rotor 31.

The encoder portion 50 is connected to the hollow rotor 31. The encoder portion 50 includes an encoder main body 51 that detects the rotation angle of the hollow rotor 31, the input shaft 52 that projects from this encoder main body 51 and is connected to the hollow rotor 31, the thin plate 53 on which the base of the encoder main body 51 is installed, a flange 54 that encloses the encoder main body 51 and fixes to the thin plate 53, a thin plate mounting portion 55 that connects the thin plate 53 to an end of the motor cover 22 of the motor housing 20, and an encoder cover 56 that covers these.

The encoder main body 51 is installed substantially in the center of the thin plate 53. The input shaft 52 passes through the thin plate 53 and is connected to substantially the center of the cushion member 31d of the hollow rotor 31.

Figure 3:
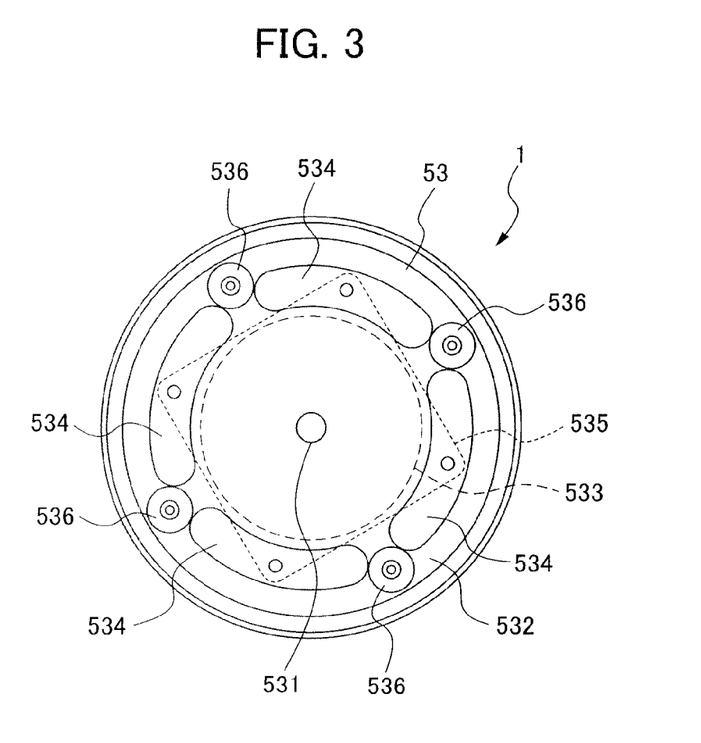
FIG. 3 is a view looking at a thin plate attached to the electric spot welding gun according to the embodiment, from the arrow A2 side shown in FIG. 1, in a state in which an encoder main body has been removed.

FIG. 3 is a view looking at the thin plate 53 attached to the electric spot welding gun 1 according to the embodiment, from the arrow A2 side shown in FIG. 1, in a state in which the encoder main body 51 has been removed. As shown in FIG. 3, the thin plate 53 is formed as a discoid body. This thin plate 53 has an input shaft through-hole 531 formed substantially in the center thereof, through which the input shaft 52 passes through. In addition, the top surface 532 of the thin plate 53 has an encoder main body installation part 533 of a circular shape with the input shaft through-hole 531 as a center. Moreover, the top surface 532 of the thin plate 53 has a flange installation part 535 of a square shape that encloses the encoder main body installation part 533, with the four corners thereof being positioned near the outer circumference of the thin plate 53.

In addition, four thin plate mounting holes 536 that engage with the thin plate mounting portion 55 (refer to FIG. 2) are formed in the top surface 532 of the thin plate 53 to the outside of each side of the flange installation part 535. In other words, the thin plate 53 is connected to an end portion of the motor cover 22 (refer to FIG. 2) of the motor housing 20 by engaging the thin plate mounting holes 536 with the thin plate mounting portion 55.

In this way, the four thin plate mounting holes 536, which are portions that connect the thin plate 53 to the motor cover 22, are disposed to the outside of the encoder main body installation part 533 and the flange installation part 535. In other words, since the top surface 532 of the thin plate 53 is formed with a surface area larger than the base of the encoder main body 51, it is possible to stably install the encoder main body 51 even if the peripheral shape of the encoder main body 51 is a flat shape.

Referring back to FIG. 2, the flange 54 has a substantially square outer surface in a plan view and an inner surface formed to follow the outer surface of the encoder main body 51 inside of the outer surface of the flange 54. The flange 54 is fixed to the thin plate 53 at four corners.

In addition, four machined portions 534 are further formed in the top surface 532 of the thin plate 53 between the four thin plate mounting holes 536 to follow the external form of the encoder main body installation part 533. Moreover, the four corners of the flange installation part 535 are preferably disposed in substantially the center of each machined portion 534, and the flange 54 is fixed at these four corners.

These machined portions 534 are portions on which an embossing process in substantially a C-shape has been performed so as to project from the top surface 532 of the thin plate 53. The surface strength of the thin plate 53 can be raised with this embossing. It should be noted that the thin plate 53 may not be provided with the machined portions 534, so long as a predetermined surface strength can be ensured.

Figure 4:
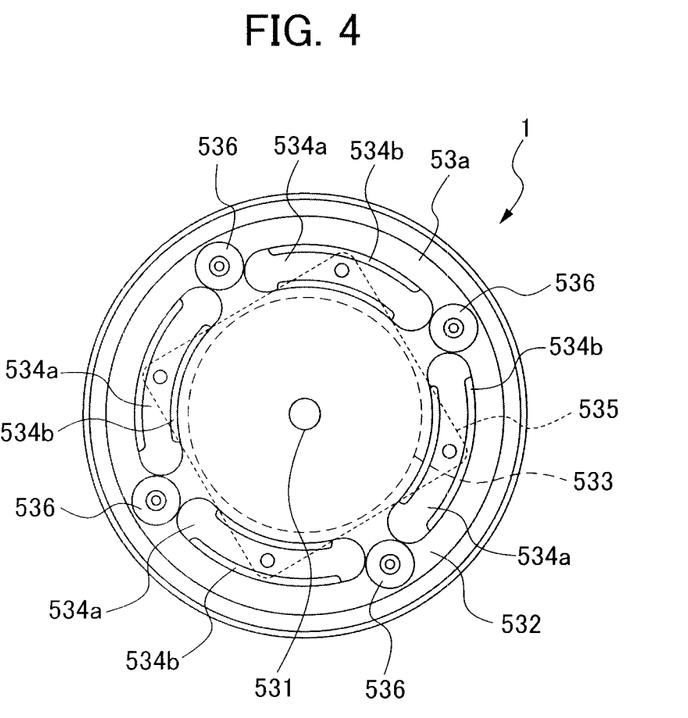
FIG. 4 is a view looking at a modified example of a thin plate attached to an electric spot welding gun according to the embodiment, from the arrow A2 side shown in FIG. 1, in a state in which an encoder main body has been removed.

FIG. 4 is a view looking at a modified example of the thin plate 53 attached to the electric spot welding gun 1 according to the embodiment, from the arrow A2 side shown in FIG. 1, in a state in which the encoder main body 51 has been removed. As shown in FIG. 4, a thin plate 53a, which is a modified example of the thin plate 53, has machined portions 534a that differ from those of the thin plate 53 (refer to FIG. 3). Cutouts 534b formed by cutting out the central portions of the substantially C-shapes from the top surface 532 are formed in the machined portion 534a. With this, the machined portions 534a also function as cushioning portions that absorb shocks in the axial direction and radial direction by causing the rigidity in directions other than the rotational direction of the thin plate 53a, i.e. the axial direction and radial direction, to decline. In other words, by fixing the flange 54 enclosing the encoder main body 51 to the machined portions 543a functioning as cushioning portions, a shock imparted to the motor housing 20 can absorbed by the machined portions 534a, which can prevent this shock from acting on the encoder main body 51.

Figure 5:
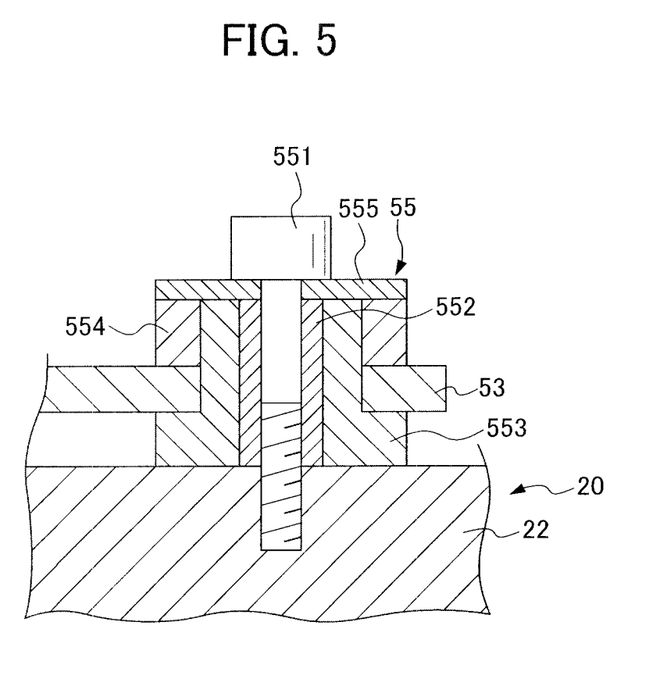
FIG. 5 is a detailed view of a thin plate mounting portion of an electric spot welding gun according to the embodiment.

FIG. 5 is a detailed view of a thin plate mounting portion 55 of the electric spot welding gun 1 according to the embodiment. As shown in FIG. 5, the thin plate mounting portion 55 includes a bolt 551 threading together with an end portion of the motor cover 22 of the motor housing 20, a cylinder 552 through which the shaft of the bolt 551 penetrates, a thin plate support part 553 that is disposed around the cylinder 552 and supports the thin plate 53, a thin plate pressure portion 554 that sandwiches the thin plate 53 between the thin plate support part 553, and a washer 555 that is disposed under the head of the bolt 551 and fixes the thin plate support part 553 and the thin plate pressure part 554. The thin plate support part 553 and the thin plate pressure part 554 are formed by gel bushings that dampen vibration. With this, shock imparted to the motor housing 20 is absorbed by the thin plate support part 553 and the thin plate pressure part 554 of the thin plate mounting portion 55 and does not act on the encoder main body 51, which is installed on the thin plate 53. In other words, the thin plate mounting portion 55 and the thin plate 53 function as an encoder dampening mechanism, which absorbs shock imparted to the motor housing 20 in the axial direction and horizontal direction, and can prevent this shock from acting on the encoder main body 51.

Specifically, the thin plate mounting portion 55 that dampens vibration is disposed to the outside of the encoder main body installation part 533 and the flange installation part 535. Consequently, wobbling in the rotational direction of the thin plate 53 of the thin plate mounting portion 55 decreases towards the center of the thin plate 53; therefore, wobbling in the rotational direction of the encoder main body 51 can be reduced, and the measurement precision of the encoder main body 51 can be improved, even if shock in the rotational direction acts on the motor housing 20.

Referring back to FIG. 2, the fixed electrode tip 61 is detachably mounted to the fixed electrode tip mounting portion 212 (refer to FIG. 1), which extends from the casing 21. The moveable electrode tip 62 is detachably mounted to the moveable electrode tip mounting portion 433 of the hollow rod 43, and opens and closes relative to the fixed electrode tip 61 by way of the reciprocal movement of the hollow rod 43 in the axial direction.

Next, operation of the electric spot welding gun 1 attached to the robot arm 80 (refer to FIG. 1) will be explained. When electric power is supplied to the coil 33 of the motor 30 from the welding gun control device 100 (refer to FIG. 1), the hollow rotor 31 rotates in a predetermined direction. The ball screw 51 of the feed screw mechanism 40 also rotates in conjunction with this rotation of the hollow rotor 31, whereby the nut portion 42 and the hollow rod 43 move to the leading end side of the ball screw 41 (arrow A1 side shown in FIG. 2). With this, the moveable electrode tip 62 mounted to a leading end of the hollow rod 43 closes relative to the fixed electrode tip 61, thereby abutting and retaining the works W1 and W2 under pressure. In this state, high current is supplied between the fixed electrode tip 61 and the moveable electrode tip 62, whereby the works W1 and W2 are spot welded.

In addition, the encoder main body 51 detects the rotation angle of the hollow rotor 31, and transmits an electrical signal to the welding gun control device 100. Based on the rotation angle of the hollow rotor 31 transmitted from the encoder main body 51, the welding gun control device 100 determines the position of the moveable electrode tip 62 from this rotation angle and the pitch of the ball screw 41 of the feed screw mechanism 40. Then, over the period prior to welding to after welding the works W1 and W2, the welding gun control device 100 controls the rotational drive of the motor 30 based on the position of the moveable electrode tip 62 thus determined, and causes the moveable electrode tip 62 to advance or retract to a predetermined position via the feed screw mechanism 40. The robot arm 80 operates together with the control of this moveable electrode tip 62 to control the position of the electric spot welding gun 1.

There are the follow operational effects according to the present embodiment. The encoder dampening mechanism includes a thin plate 53 that is formed to have a surface area of a top surface 532 thereof that is larger than a surface area of a base of the encoder main body 51, and on which the base of the encoder main body 51 is installed within the top surface of the thin plate, and a thin plate mounting portion 55 that connects the thin plate 53 to the motor housing 20 via the thin plate mounting portion 553 and the thin plate pressure part 554.

With this, the encoder main body 51 can be stably installed even if the peripheral shape of the encoder main body 51 is a flat shape, by installing the encoder main body 51 on the thin plate 53 formed with a top surface 532 that is larger than the surface area of the base of the encoder main body 51. In addition, since shock transmitted from the motor housing 20 can be absorbed by the thin plate support part 553 and the thin plate pressure part 554, by way of connecting the thin plate 53, on which this encoder main body 51 is installed, to the motor cover 22 of the motor housing 20 via the thin plate support part 553 and the thin plate pressure part 554, which dampen vibration, it is possible to prevent this shock from acting on the encoder main body 51 installed on the thin plate 53. Therefore, an encoder dampening mechanism can be provided that absorbs shock acting on an encoder having a peripheral shape that is a flat shape, and prevents failure of the encoder.

It should be noted that the present invention is not to be limited to the aforementioned embodiment, and modifications, improvements, etc. within a scope that can achieve the object of the present invention are included in the present invention. For example, although the thin plate support part 553 and the thin plate pressure part 554 serving as cushioning material are formed by gel bushings in the present embodiment, they are not limited thereto. The thin plate support part 553 and the thin plate pressure part 554 serving as the cushioning material can be formed by a spring or a sponge, so long as being members that dampen vibration.

What is claimed is:

1. An encoder dampening mechanism for an electric spot welding gun equipped with a servo motor that is accommodated inside of a motor housing and causes a rotor to rotate, and an encoder that detects a rotation angle of the rotor, the mechanism comprising:
    a thin plate that is formed with a top surface that is larger in a surface area than a base surface of the encoder, and on which the base surface of the encoder is installed within the top surface of the thin plate; and
    a thin plate mounting portion that connects the thin plate to the motor housing via a cushioning material that dampens vibration,
        the encoder includes a flange that encloses the main body of the encoder and fixes to the flange installation part of the thin plate, the surface of the thin plate includes the flange installation part and an encoder main body installation part that installs the base surface of the encoder, the thin plate mounting portion that includes the cushioning material is disposed on an outer side of the flange installation part and the encoder main body installation part on the surface of the thin plate, and the surface area on the inner side from the thin plate mounting portion on the surface of the thin plate is larger than the base surface of the encoder.

2. The encoder dampening mechanism according to claim 1, wherein the thin plate includes a machined portion that is formed along an outer shape of the encoder main body installation part, and is machined to project from the surface, and the flange installation part is disposed on the machined portion.

* * * * *